(12) United States Patent
Diekhans

(10) Patent No.: US 7,618,311 B2
(45) Date of Patent: Nov. 17, 2009

(54) METHOD AND DEVICE FOR ADJUSTING THE LENGTH OF CUT OF A CHOPPING DEVICE OF AN AGRICULTURAL HARVESTING MACHINE

(75) Inventor: Norbert Diekhans, Guetersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 11/733,522

(22) Filed: Apr. 10, 2007

(65) Prior Publication Data

US 2007/0266687 A1    Nov. 22, 2007

(30) Foreign Application Priority Data

Apr. 21, 2006 (DE) .................... 10 2006 019 243

(51) Int. Cl.
*A01D 75/18* (2006.01)
*A01F 12/16* (2006.01)
*A01F 21/00* (2006.01)

(52) U.S. Cl. .................................................. 460/7

(58) Field of Classification Search .............. 460/6, 460/7, 1; 56/14.1, 16.4, 10.2 B, 10.2 E, 10.2 G, 56/10.2 R; 73/861.73, 861.72, 73
See application file for complete search history.

(56) References Cited

U.S. PATENT DOCUMENTS

| | | | | |
|---|---|---|---|---|
| 3,945,175 A * | 3/1976 | Barkstrom et al. | ............ | 56/10.8 |
| 5,795,221 A * | 8/1998 | Diekhans | ........................ | 460/6 |
| 5,901,535 A * | 5/1999 | Duckinghaus et al. | ... | 56/10.2 G |
| 5,921,071 A * | 7/1999 | Paquet et al. | .................. | 56/16.6 |
| 6,257,072 B1 * | 7/2001 | Diekhans | .................. | 73/861.26 |
| 6,401,549 B1 * | 6/2002 | Ohlemeyer | .............. | 73/861.73 |
| 6,421,990 B1 * | 7/2002 | Ohlemeyer et al. | ...... | 56/10.2 R |
| 6,874,304 B2 * | 4/2005 | Clauss | ..................... | 56/10.2 R |
| 6,926,604 B2 * | 8/2005 | Weber et al. | ................... | 460/6 |
| 7,073,314 B2 * | 7/2006 | Beck et al. | ............... | 56/10.2 B |
| 2003/0217538 A1 | 11/2003 | Pirro | | |
| 2004/0200200 A1 * | 10/2004 | Quincke et al. | .......... | 56/10.2 R |
| 2005/0218254 A1 * | 10/2005 | Wolf et al. | .................. | 241/242 |
| 2006/0191251 A1 * | 8/2006 | Pirro et al. | ...................... | 56/60 |
| 2007/0010305 A1 * | 1/2007 | Vogelgesang | ............... | 460/112 |
| 2007/0213106 A1 * | 9/2007 | Degen et al. | .................. | 460/1 |

FOREIGN PATENT DOCUMENTS

DE    102 20 699    12/2003

* cited by examiner

*Primary Examiner*—Árpád Fábián-Kovács
(74) *Attorney, Agent, or Firm*—Michael J. Striker

(57) ABSTRACT

A chopping device and method of using the chopping device in an agricultural harvesting machine to adjust a length of cut, where the length of cut of the chopping device is adjusted depending on a rebound behavior of crop material to be chopped.

14 Claims, 3 Drawing Sheets

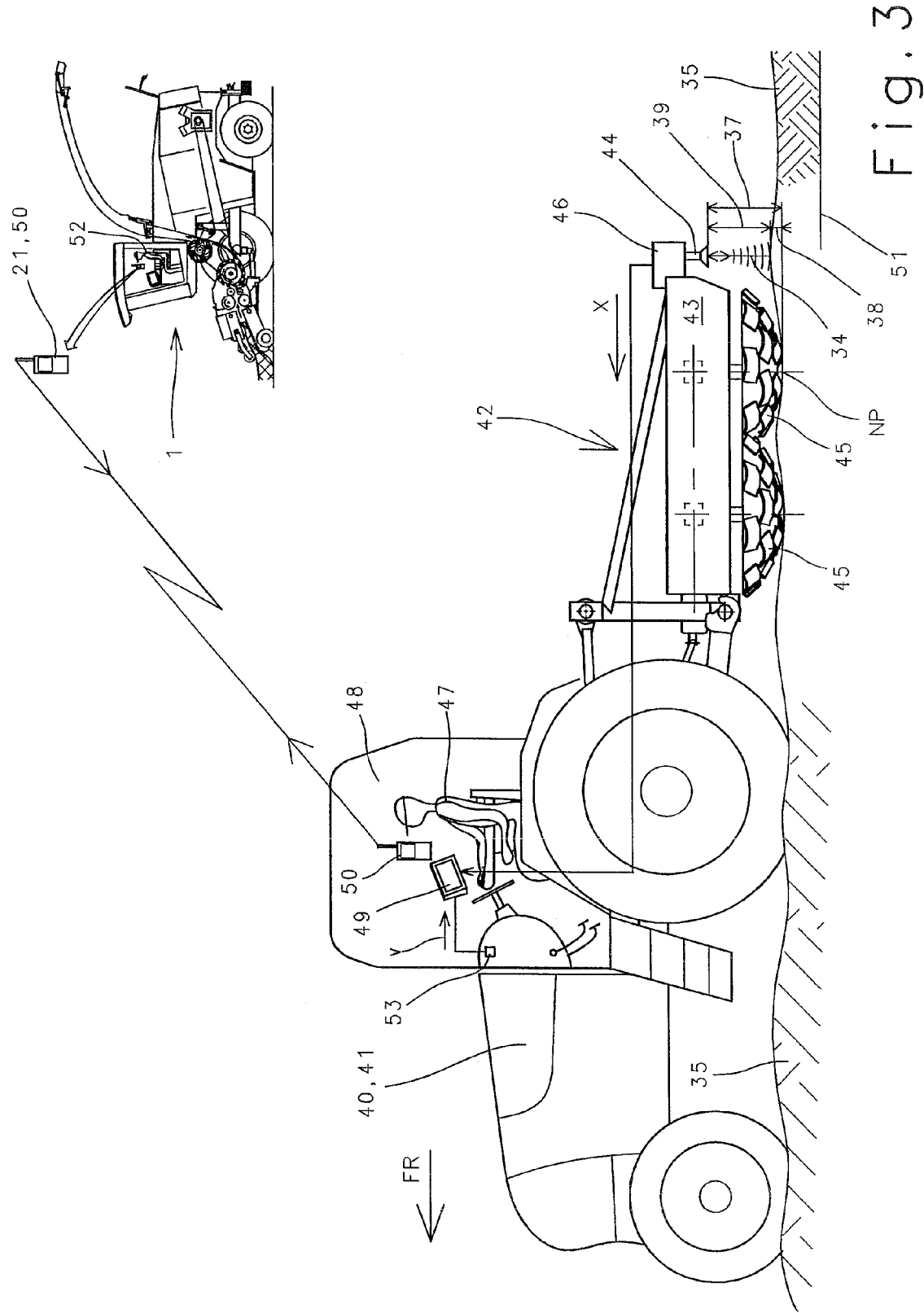

METHOD AND DEVICE FOR ADJUSTING THE LENGTH OF CUT OF A CHOPPING DEVICE OF AN AGRICULTURAL HARVESTING MACHINE

CROSS-REFERENCE TO A RELATED APPLICATION

The invention described and claimed hereinbelow is also described in German Patent Application DE 10 2006 019 243.5 filed on Apr. 21, 2006. This German Patent Application, whose subject matter is incorporated here by reference, provides the basis for a claim of priority of invention under 35 U.S.C. 119(a)-(d).

BACKGROUND OF THE INVENTION

The present invention relates to a method and a device for adjusting the length of cut of a chopping device of an agricultural harvesting machine according to the preamble of Claims 1 and 8.

Publication DE 102 20 699 A1 makes known a device that includes a sensor for registering chopped material parameters. Depending on the parameters measured, particularly the moisture content of the crop material, the length of cut of the chopping device is automatically adjusted. It is a disadvantage, however, that the length-of-cut setting selected in this manner does not necessarily indicate whether optimal compression of the crop material can be attained with the least amount of compression effort. This first becomes clear in a subsequent working process, e.g., during silage in the horizontal silo.

In order to nevertheless attain good air exclusion for the fermentation process taking place in the silage, it must be possible to compress the crop material chopped by the chopping device in the silo in an optimal manner. The amount of compression force to be applied depends on the compressibility of the chopped crop material, which, in turn, depends on the length of cut of the crop material. As described above, means for adjusting the length of cut of a chopping device are known, but they do not provide an exact indication of the compressibility of the crop material. It would be feasible to always chop the crop material so finely that a satisfactory level of compressibility would result when the material is dry. A procedure of this type is not economical, however, because energy is wasted when the material is chopped more finely than necessary, and because moist material becomes difficult to handle when it is chopped too finely.

SUMMARY OF THE INVENTION

The object of the present invention, therefore, is to provide a method and a device for adjusting the length of cut of a chopping device of an agricultural harvesting machine that prevent the disadvantages described in the related art and adjusts the length of cut of the chopping device depending on the compressibility of the crop material such that an optimal and efficient compression process in the horizontal silo is made possible.

In keeping with these objects and with others which will become apparent hereinafter, one feature of the present invention resides, briefly stated, in a method for adjusting a length of cut of a chopping device of an agricultural harvesting machine, comprising the steps of measuring rebound behavior of a crop material to be chopped; and adjusting a length of cut of the chopping device depending on the measured rebound behavior of the crop material to be chopped.

Another feature of the present invention resides, briefly stated, in a device for adjusting a length of cut of a chopping device of an agricultural harvesting machine with at least one intake roller and one compression roller and a chopper drum, said device including at least one sensor mountable on the agricultural harvesting machine for determining a rebound behavior of a compressed crop material; a control; and a control and evaluation unit which is coupled with said sensor and which, based on a sensor signal, generates a rebound signal for adjusting the length of cut of the chopping device.

Given that the length of cut of a chopping device is adjusted depending on the measured rebound behavior of the crop material, the adjustment of the length of cut of the chopping device can be selected—based on the measured rebound behavior—such that the subsequent compression process in the horizontal silo can take place particularly efficiently, while attaining optimal silage quality.

In an advantageous embodiment of the present invention, the length of cut of the chopping device can be adjusted to be that much shorter the greater the intensity is of the rebound behavior of the compressed crop material and, vice versa, the length of cut can be adjusted to be that much longer the weaker the intensity is of the rebound behavior of the crop material, thereby ensuring that selection of the length of cut of the chopping device tends to be correct. The operator of the agricultural harvesting machine therefore need not spend his time searching for the optimal length of cut.

Given that the rebound behavior of the compressed crop material is determined in time intervals, and the length of cut of the chopping device is adjusted—either manually by the operator or automatically using a control and evaluation device—according to the particular measured intensity of the rebound behavior, it is ensured that the length of cut of the crop material is continually adjusted according to the amount of effort required to compress the crop material. As the amount of compression work performed increases, the length of cut of the chopping device can be adjusted immediately.

Given that the rebound behavior of the compressed crop material is determined automatically, it is advantageously possible to further automate the adjustment of the length of cut of the chopping device.

An embodiment of the present invention that works particularly well in practice results when an agricultural harvesting machine—during the harvesting process—and/or an agricultural working machine—during the compression process in a horizontal silo—determines the rebound behavior of the crop material using at least one sensor located on it, and the sensor signal that is determined is used by a connected control and evaluation unit to adjust the length of cut of the chopping device. As a result, optimal adjustment of the length of cut of the chopping device—from the harvesting process to the process of compressing the crop material in the horizontal silo—is ensured, thereby enabling the compression process in the horizontal silo to be carried out efficiently. In addition, the calibration tasks to be performed by the operator of the agricultural harvesting machine on the adjusting system of the chopping device can be advantageously reduced to a minimum.

In a preferred embodiment of the present invention, the rebound behavior determined in the silo of the agricultural working machine is automatically transmitted on-line using a data transmission network to the agricultural harvesting machine so that, even when the agricultural harvesting machine that is chopping the crop material does not include a sensor for determining the rebound behavior of the crop material, it is still possible via the on-line data exchange to optimally adjust the length of cut of the chopping device, thereby ensuring efficient use of the agricultural harvesting machine for chopping the crop material, and efficient use of the agricultural working machine during the compression process in the horizontal silo.

The object of the present invention is further attained via a device that is characterized by the fact that the agricultural harvesting machine includes a sensor for determining the rebound behavior of the crop material; a control and evaluation unit is coupled with the sensor and, based on the sensor signal, it generates a rebound signal for adjusting the length of cut of the chopping device. Using this sensor, the rebound behavior of the crop material can be advantageously determined and monitored on the agricultural harvesting machine, and, based thereon, the length of cut of the chopping device is adjusted.

In a further advantageous embodiment of the present invention, the sensor removes a crop material sample from the crop material flow passing through the agricultural harvesting machine, then compresses the crop material sample in a defined manner and releases it; the sensor is designed to generate a rebound signal that is proportional to the rebound of the crop material sample, i.e., from its compressed position to the released position. Due to this procedure, it is ensured that a correct rebound signal is generated for adjusting the length of cut of the chopping device, independently of the different conveyance properties of the different crop materials.

The present invention works particularly well in practice when the sensor on an agricultural harvesting machine is designed as a compressing device that can be filled with a crop material sample, thereby ensuring that the rebound behavior of the crop material can be advantageously determined independently of the quantity or throughput speed of the crop material or further interference factors.

In a further advantageous embodiment of the present invention, the sensor is provided on an agricultural working machine during silage in a horizontal silo, and it is designed to measure the change in height of the crop material compressed in the horizontal silo; a control and evaluation device connected thereto is also provided, and is designed to evaluate the sensor signal in order to generate a rebound signal and introduce measures for adjusting the length of cut of the chopping device of the agricultural harvesting machine when the rebound signal indicates that the compressibility of the crop material placed in the horizontal silo has changed. As a result, even when the agricultural harvesting machine does not include a sensor for determining the rebound behavior, it is still possible to optimally adjust the length of cut of the chopping device, e.g., by transmitting the generated rebound signal to the agricultural harvesting machine, so that suitable measures can be implemented there in order to adjust the length of cut of the chopping device in an optimal manner.

Given that the at least one sensor senses the change in height from the compressed state to the released state of the crop material placed in the horizontal silo, and the sensor is designed to generate—based on the difference of the height change—a rebound signal that is proportional to the change in height, it is advantageously possible to determine a rebound signal in the horizontal silo in a technically simple manner and to use it to adjust the length of cut of the chopping device of the agricultural harvesting machine. It is therefore cost-favorable and, therefore, advantageous, to design at least one sensor as an ultrasonic sensor.

An advantageous refinement of the inventive method is attained when the rebound signal generates a chopper drum speed signal in the control and evaluation unit; a rebound signal that represents a strong rebound causes the chopper drum speed to increase, and a rebound signal that represents a slight rebound causes the chopper drum speed to decrease, thereby ensuring that selection of the length of cut of the chopping device tends to be correct without the operator of the agricultural harvesting machine having to spend time testing it himself.

The same advantageous effect is attainable when the rebound signal generates a signal in the control and evaluation unit to regulate the intake and compression roller speed; a rebound signal that represents a strong rebound causes the intake and compression roller speed to be reduced, and a rebound signal that represents a slight rebound causes the intake and compression roller speed to be increased, thereby ensuring that the adjustment of the length of cut of the chopping device tends to be correct in this case as well, while also relieving the operator of duties, because the calibration work required therefor is eliminated.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 shows the inventive method on an agricultural working machine during silage in a horizontal silo.

DESCRIPTION OF THE PREFERRED EMBODIMENTS

Figure 1:
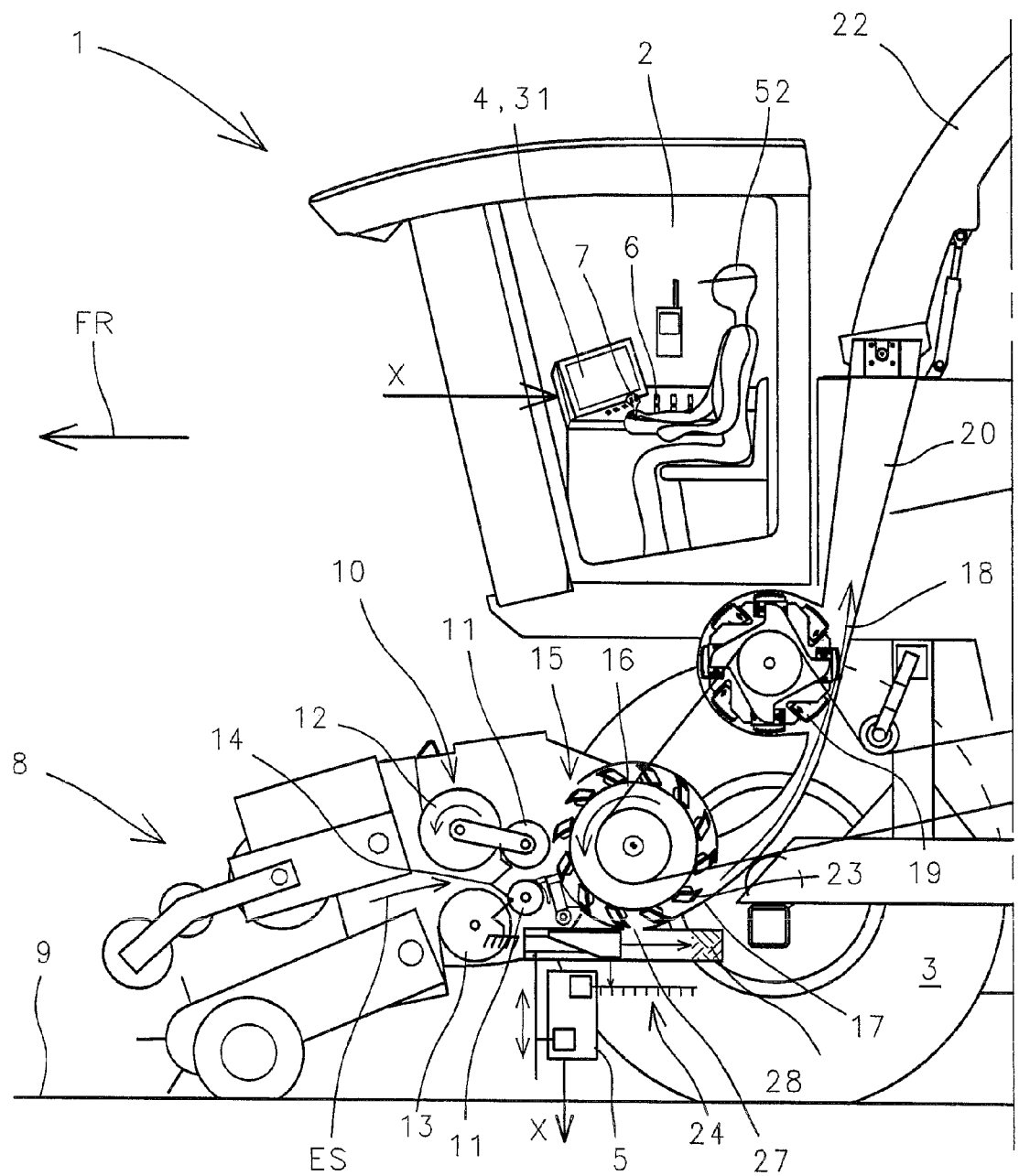
FIG. 1 shows the inventive method on a front section of a forage harvester, in a side view.

FIG. 1 shows a front—relative to direction of travel FR—part of an agricultural harvesting machine designed as a forage harvester 1 with a driver's cab 2 and a drive wheel 3. Depicted in driver's cab 2 is a display device 4 and at least one control and evaluation unit 5, and further operating elements used to operate forage harvester 1, such as switch 6 and ground speed control lever 7. Forage harvester 1 shown is equipped with a front attachment 8, with which forage harvester 1 picks up not-shown crop material from ground 9 and transfers it to downstream intake assembly 10, spread across its width. Two driven, lower intake rollers 11 and two driven, upper, movably supported compression rollers 12, 13 are located inside intake assembly 10. The crop material conveyed to intake assembly 10 is compressed between intake rollers 11 and compression rollers 12, 13 by the force applied to compression rollers 12, 13 by at least one spring 14, and the crop material is transferred to downstream chopping device 15. Inside chopping device 15, rotating chopper drum 16 chops the crop material and actively conveys it along drum disc 17 in conveyance direction 18 to post-accelerator 19. There, the crop material is accelerated again and transferred via discharge chute 20 and subsequent upper discharge chute 22 into a not-shown transport container.

Length of cut SL (see FIG. 2) of the crop material can be regulated using chopping device 15 in a manner to be described in greater detail below. The length of cut can be changed initially by changing chopper drum speed N2 (see FIG. 2) while maintaining a constant crop material intake speed. The length of cut can be changed further by regulating intake and compression roller speed N1 (see FIG. 2). The adjustment of length of cut SL of chopping device 15 also depends on the number of knives 23 mounted on chopper drum 16; this number is typically not changed during the harvesting process.

According to the present invention, a method is provided for adjusting length of cut SL of chopping device 15 that makes it possible to adjust length of cut SL of chopping device 15 such that, with consideration for the rebound behavior of the crop material, it is possible to attain an optimal and efficient compression process in the horizontal silo and to therefore also relieve the operator of the calibration work that would be required to adjust length of cut SL of chopping device 15 in an optimal manner.

To carry out the method, a sensor designed as a compression device 24 is located on drum disc 17. In analogy to DE 10 2006 009 575.8—the disclosure of which is hereby referred to directly and is therefore part of the disclosure of the present invention—compression device 24 includes a compression element 25a designed as a compressing plunger 25 that is movably located in a sample chamber 26. Sample chamber 26 is oriented in direction of travel FR of forage harvester 1, which nearly corresponds to the direction of crop material flow ES along drum disc 17. Conveyance direction 18 of the crop material is opposite to direction of travel FR. Due to the design, compressing plunger 25 performs compression and moves inside sample chamber 26 in the same direction in which sample chamber 26 is oriented. Drum disc 17 is designed to redirect material, and it includes an opening 27.

In accordance with the inventive method, compression device 24 designed as a sensor removes a material sample 28 from crop material flow ES passing through the agricultural harvesting machine and directs it to sample chamber 26, where material sample 28 is compressed in a defined manner and is then released. A position sensor 29 extends across nearly the entire length of compressing device 24, thereby enabling it to simultaneously determine the position of compressing plunger 25 and the expansion of material sample 28 in the compressed and released states.

Based on the expansion of material sample 28 in the compressed and released states, a rebound signal X that is proportional to the rebound of crop material sample 28 is generated in control and evaluation unit 5 coupled with position sensor 29. Rebound signal X also serves as a measure of the rebound behavior, which is representative of the compression property. During the compression process in compression device 24, control and evaluation unit 5 can continuously determine—in a manner known per se—the position of compressing plunger 25 and/or the volume of material sample 28, compressing force VK, and the rebound behavior of material sample 28, and it can store this information as a reference measured value in a memory device 31.

According to FIG. 1, control and evaluation unit 5 coupled with compression device 24 is designed to steplessly control the adjustment of length of cut SL of chopping device 15, by changing speed N2 of chopper drum 16 and by influencing speed N1 of intake and compression rollers 11, 12, 13. Control and evaluation unit 5 compares the particular current rebound signal X with the reference measured values stored in memory device 31, to which a related length of cut SL is assigned. Based on this comparison, control and evaluation unit 5 influences—in a manner to be described in greater detail—speed N1 of intake and compression rollers 11, 12, 13 and/or speed N2 of chopper drum 16, in order to adjust length of cut SL of chopping device 15. The reference measured values for the length-of-cut adjustment can be obtained via testing or other suitable sources.

Control and evaluation unit 5 tends to adjust length of cut SL of chopping device 15 to be that much shorter the greater the intensity is of the rebound behavior of compressed material sample 28 in sample chamber 26 and, vice versa, it adjusts length of cut SL to be that much longer the lesser the intensity is of the rebound behavior of material sample 28. The crop material therefore tends to have correct length of cut SL, which then enables an efficient compression process and optimal silage quality to be attained in the subsequent compression process in the horizontal silo.

According to the present invention, the rebound behavior is determined in time intervals, and length of cut SL of chopping device 15 is adjusted—either manually by the operator or automatically using control and evaluation device 5—according to the particular measured intensity of the rebound behavior, thereby ensuring that length of cut SL of the crop material is continually adjusted according to the force required to compress the crop material. As the amount of compression work performed increases, length of cut SL of chopping device 15 can be adjusted immediately. The rebound behavior of the compressed crop material is preferably determined automatically, thereby also making it possible to further automate the adjustment of length of cut SL of chopping device 15 and to minimize the amount of calibration work required by the operator of the agricultural harvesting machine on a not-shown adjustment system of chopping device 15.

Figure 2:
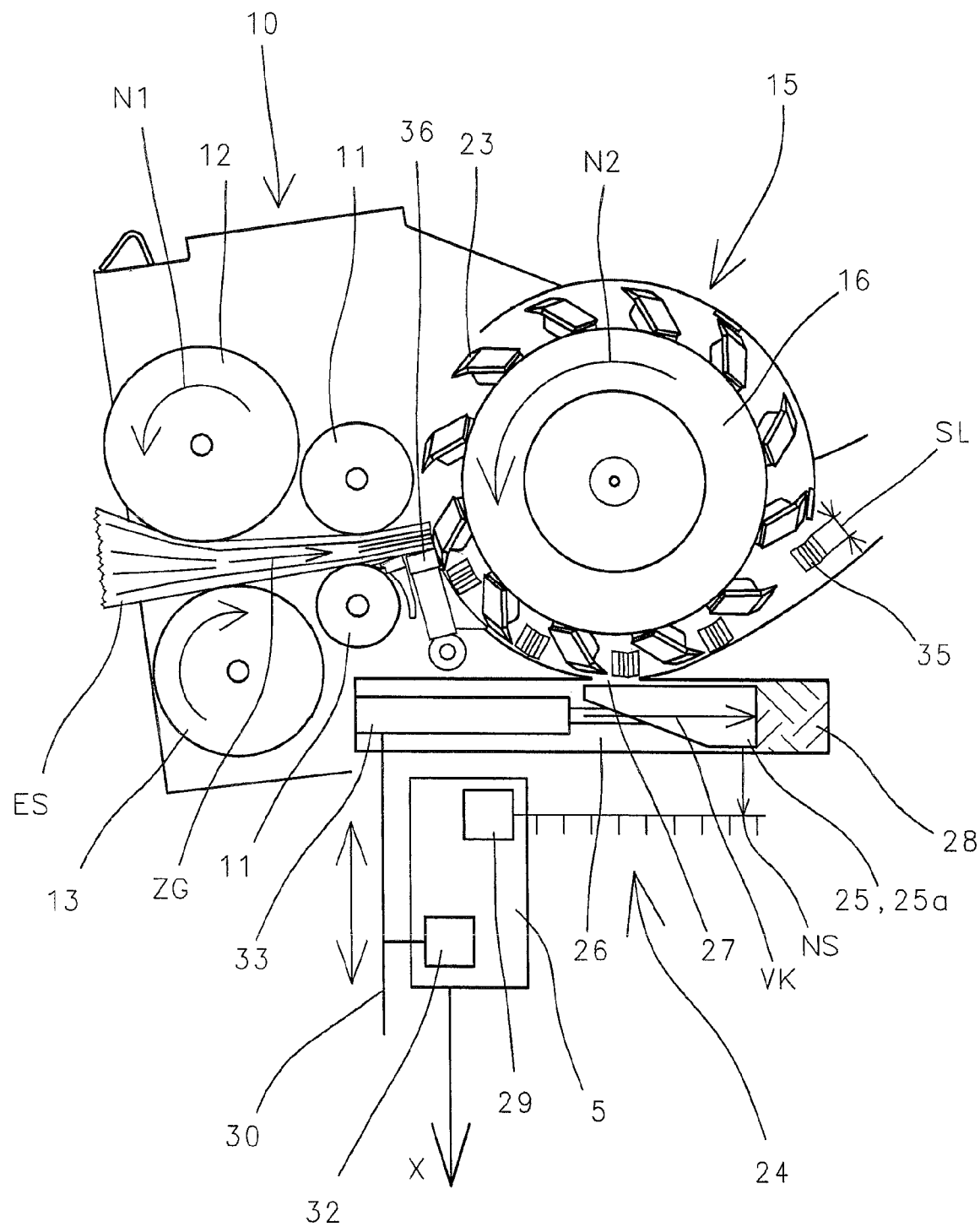
FIG. 2 shows the inventive method on a chopping device of a forage harvester, in a detailed longitudinal sectional view.

FIG. 2 shows intake assembly 10—that includes a chopping device 15—of a forage harvester 1, in an enlarged longitudinal sectional view. After crop material 35 is cut by a front harvesting attachment of a forage harvester 1—the type of which depends on the particular harvesting method and is not shown here—crop material 35 to be chopped is conveyed through several conveyance devices, between two rotating intake and compression rollers 11, 12, 13, and reaches rotating chopper drum 16. Intake and compression rollers 11, 12, 13 and chopper drum 16 are driven by a drive that is known per se and is therefore not shown. The chopping process takes place in interaction with a fixed shear bar 26, using knives 23 mounted at a cutting angle on the circumference of rotating chopper drum 16. In the exemplary embodiment, cut cropped material 35 has predefined length of cut SL.

Length of cut SL of harvested crop material 35 depends on speed N2 of intake and compression rollers 11, 12, 13 and on speed N2 of chopper drum 16 and/or the number of knives 23 on chopper drum 16, which typically remains constant during the working process. In accordance with the inventive method, compression device 24 designed as a sensor removes a material sample 28 from crop material flow ES passing through the agricultural harvesting machine and directs it to sample chamber 26. Compression device 24 includes a compressing plunger 25 and a compression element 25a. Compressing plunger 25 is moved inside sample chamber 26 via a controlled reciprocating cylinder 33, which can induce compressing plunger 25 to simultaneously perform a translatory motion and a rotational motion.

An electrohydraulic control device—which is not shown here but is known to one skilled in the art—prompts oil to be delivered to reciprocating cylinder 33 via schematically depicted hydraulic control 30 in response to a command from a not-shown, higher-order sample control unit. As a result, reciprocating cylinder 33 moves compressing plunger 25 into the front end position shown. The pressure in hydraulic control 30 is measured by a pressure sensor 32. Based on the pressure reading, compressing force VK introduced into material sample 28 is determined, and it is representative of the defined compression of material sample 28. The position of compressing plunger 25 in sample chamber 26 is detected by a position sensor 29 and is queried by the sample control unit.

Position sensor 39 extends across nearly the entire length of compressing device 24, thereby enabling it to simultaneously determine the position of compressing plunger 25 and the expansion of material sample 28 in the compressed and released states. Compressing plunger 25 exerts predefined compressing force VK on material sample 28; the front end position that is reached is defined as null position NS. After the front end position is reached, the oil supply to reciprocating cylinder 33 is interrupted and the pressure on material sample 28 is released. Based on the rebound potential of the compressed crop material, depressurized compressing plunger 25 is displaced toward the rear end position via the rebound potential of the compressed crop material. Based on the rebound of material sample 28 relative to null position NS, a rebound signal X that is proportional to the rebound of crop material sample 28 is generated in a control and evaluation unit 5 assigned to position sensor 39.

In a manner according to the present invention, rebound signal X also serves as a measure of the rebound behavior, which is representative of the compression property, and it can be stored in a memory device 31 as a reference measured value. As an alternative, the rebound behavior can be determined by reducing the oil pressure in hydraulic control 30. The pressure sensor then senses the rebound pressure of the compressed crop material and, based thereon, connected control and evaluation unit 5 generates a rebound signal X that is proportional to the rebound pressure. This rebound signal X is compared by control and evaluation unit 5 with reference measured values that are stored in a not-shown memory device.

A length of cut SL is assigned to these reference measured values and enables optimal compression of crop material 35 and, therefore, an efficient compression process to be attained in the subsequent compression process in the horizontal silo. Length of cut SL assigned to particular rebound signal X is obtained via testing or other suitable sources. If the current length-of-cut setting SL does not correspond to length of cut SL that is recommended based on rebound signal X in order to attain an efficient compression process in the horizontal silo, control and evaluation unit 5 adjusts length of cut SL of chopping device 15 by controlling the drive of intake and compression rollers 11, 12, 13 or chopper drum 16 coupled therewith.

Length of cut SL can be adjusted by influencing intake and compression roller speed N1. By changing intake and compression roller speed N1, intake speed ZG of crop material 35 to chopper drum 16 can be regulated in a stepless manner, thereby changing the length of cut while chopper drum speed N2 remains constant. When all other conditions remain the same, a higher speed results in a longer length of cut SL, since the crop material is now delivered to chopper drum 16 at a higher rate of speed and the distance covered by the crop material within the constant cutting interval of knives 23 of chopper drum 16 increases. When all other conditions remain the same, reducing intake and compression roller speed N1 therefore results in a reduction of length of cut SL of the crop material.

Control and evaluation unit 5 also controls the adjustment of length of cut SL of chopping device 15 by controlling chopper drum speed N2. Reducing chopper drum speed N2 increases the time intervals between the individual cutting points of knives 23 of chopper drum 16, thereby resulting in a longer length of cut SL of chopping device 15. In contrast, increasing chopper drum speed N2 results in a shorter length of cut SL, when all other conditions remain the same. This variant also enables length of cut SL of chopping device 15 to be regulated in a stepless manner while intake and compression roller speed N1 remains constant. Advantageously, when a rebound signal X that represents a strong rebound is registered, intake and compression roller speed N1 is reduced and chopper drum speed N2 is increased, and when a rebound signal X is registered that represents a slight rebound, intake and compression roller speed N1 is increased and chopper drum speed N2 is reduced. As a result, the correct length-of-cut setting tends to be selected, which enables an efficient compression process to be carried out in the horizontal silo without requiring that the operator of the agricultural harvesting machine spend a lot of time searching for correct length of cut SL.

As an alternative, in FIG. 3, a sensor 44 is located on an agricultural working machine 40 that fills a horizontal silo, in order to sense the rebound behavior of crop material 35 compressed in the horizontal silo. In the exemplary embodiment, agricultural working machine 40 is a tractor 41—which is known per se—and a compressing device 42 assigned to the rear side thereof. With regard for a more detailed description and a description of the mode of operation of tractor 41 and compression device 42, reference is made to publication DE 10 2006 009 575.8 mentioned above, the teaching of which is integrated in this disclosure via reference. Sensor 44 is located at the rear, in the center, on frame 43 of compression device 42. Sensor 44 is a gap sensor that includes a not-shown transmitter for ultrasonic radiation, and a related receiver.

The transmitter transmits in the direction toward ground 51 and laid-down crop material 35, and receiver receives the ultrasonic radiation reflected by ground 51 and crop material 35. Sensor 44 senses the gap between sensor 44 and crop material 35 after it has been compressed in the horizontal silo by compression device 42. The null point NP in the exemplary embodiment is the ground side of a compression element 45 assigned to compression device 42. In control and evaluation unit 46, which is coupled to sensor 44, a rebound signal X that is proportional to rebound 38 of crop material 35 is generated based on the distance between sensor 44 and crop material 35 relative to null distance 37. Ground speed V of tractor 41, which influences the signal, is corrected using suitable correction values.

It is also possible for agricultural working machine 40 to stand still for a period of time after the compression procedure and, at the end of this time period, for a rebound signal X to be generated by control and evaluation unit 46 using attached sensor 44 based on rebound 38 that was registered. It is also feasible to place sensor 44 or several sensors in other locations on compression device 42 or agricultural working machine 40. Instead of the gap sensor used here, other sensors that are known per se and that are suitable for measuring a gap can be used. The distance from null point NP to sensor 44 must be adequate so there is enough space for rebound 38 of compressed crop material 35. Advantageously, the rebound behavior of crop material 35 placed in the horizontal silo is determined in time intervals, by way of which faulty length-of-cut adjustments can be avoided. These can result, e.g., if crop material 35 is not distributed homogeneously in the horizontal silo and pronounced peaks and valleys remain, despite the compression process. As a result, incorrect rebound signals X can be generated.

Reference measured values with assigned lengths of cut SL are stored in control and evaluation unit 46 for comparison purposes. The rebound behavior of compressed crop material 35 is preferably determined automatically by sensor 44. If, e.g., a more intense rebound behavior is registered—which, in turn, indicates that more compression effort is required to attain optimal compression of crop material 35 in the silo—a related warning is displayed to operator 47 of agricultural working machine 40 via display device 49 located in driver's cab 48, so he can initiate suitable measures. It is now feasible that operator 47 of agricultural working machine 40 notifies operator 52 of the agricultural harvesting machine designed as forage harvester 1—via a telecommunication device 21, e.g., a radiotelephone 50—that a shorter length of cut SL is required to ensure optimal and efficient compression of crop material 35, so operator 52 of agricultural harvesting machine designed as forage harvester 1 can shorten cut of length SL of chopping device 15 as required, using a not-shown adjustment device.

It is also feasible—in order to relieve operator 47 of agricultural working machine 40 and operator 52 of forage harvester 1 of tasks—that the process described above—from the determination of the rebound behavior of crop material 35 in the horizontal silo to adjustment of length of cut SL of chopping device 15 of agricultural harvesting machine—is carried out automatically by particular control and evaluation units 5, 46 using an on-line data transmission network that is not described in greater detail. In that case, however, control and evaluation devices 5, 46 are designed such that operator 47 of agricultural working machine 42 and/or operator 52 of the agricultural harvesting machine can also intervene in the process manually and thereby respond to changing conditions.

One skilled in the art is capable of transforming the invention described in a manner not described, or to use it in applications other than those shown here, to obtain the effects described, without leaving the scope of the present invention.

It will be understood that each of the elements described above, or two or more together, may also find a useful application in other types of methods and constructions differing from the type described above.

While the invention has been illustrated and described as embodied in a method and device for adjusting the length of cut of a chopping device of an agricultural harvesting machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for adjusting a length of cut of a chopping device of an agricultural harvesting machine, comprising the steps of measuring a rebound behavior of a crop material to be chopped; and adjusting a length of cut of the chopping device depending on the measured rebound behavior of the crop material to be chopped;
   wherein said adjusting includes adjusting the length of cut of the chopping device to be that much shorter the greater the intensity is of the rebound behavior of the crop material which is compressed, and to be that much longer the weaker the intensity is of the rebound behavior of the crop material which is compressed.

2. A method as defined in claim 1, wherein said measuring the rebound behavior includes determining the rebound behavior of the crop material which is compressed in time intervals, while said adjusting includes adjusting the length of cut of the chopping device manually by an operator of the agricultural harvesting machine or automatically using a control and evaluation unit, with consideration for a particular intensity of the rebound behavior that was determined.

3. A method as defined in claim 1, wherein said measuring includes determining automatically the rebound behavior of the crop material which is compressed.

4. A method as defined in claim 1, wherein said measuring the rebound behavior includes determining by the agricultural harvesting machine during a harvesting process or by an agricultural working machine during a compression process in a horizontal silo, using at least one sensor, and using a signal determined by the sensor by a connected control and evaluation unit to adjust the length of cut of the chopping device.

5. A method as defined in claim 1; and further comprising transmitting the measured rebound behavior on-line using a data transmission network from an agricultural working machine to an agricultural harvesting machine.

6. A device for adjusting a length of cut of a chopping device of an agricultural harvesting machine with at least one intake roller and one compression roller and a chopper drum, said device including at least one sensor mountable on the agriculutral harvesting machine for determining a rebound behavior of a compressed crop material; and a control and evaluation unit which is coupled with said at least one sensor and which, based on a sensor signal, generates a rebound signal for adjusting the length of cut of the chopping device;
   wherein the length of cut of the chopping device is controlled to be that much shorter the greater the intensity is of the rebound behavior of the crop material which is compressed, and to be that much longer the weaker the intensity is of the rebound behavior of the crop material which is compressed.

7. A device as defined in claim 6, wherein said at least one sensor is configured so that it removes a crop material sample from a crop material flow passing through the agricultural harvesting machine, then compresses the crop material sample in a defined manner and releases it, said at least one sensor being configured to generate the rebound signal that is proportional to a rebound of the crop material sample from a compressed position to a released position.

8. A device as defined in claim 7, wherein said at least one sensor is configured as a compressing device that can be filled with the crop material sample.

9. A device for adjusting as defined in claim 6; and further comprising an agricultural working machine with at least one other sensor mountable on the agricultural working machine and configured to determine a rebound behavior of crop material compressed in a horizontal silo; wherein said control and evaluation device is configured to evaluate another signal from said at least one other sensor and to introduce measures for adjusting the length of cut of the chopping device of the agricultural harvesting machine when the rebound signal generated by said control and evaluation device indicates that a compressability of the crop material placed in a horizontal silo has changed.

10. A device as defined in claim 9, wherein said at least one other sensor senses a change in height from a compressed state to a released state of the crop material placed in the horizontal silo, said at least one other sensor being configured to generate, based on a difference of a height change, said another signal which is proportional to the change in height.

11. A device as defined in claim 9, wherein said at least one other sensor is configured as a gap sensor.

12. A device as defined in claim 6, wherein said control and evaluation unit is configured so that the rebound signal influences a rotational speed of a chopper drum, wherein a rebound signal value that represents a strong rebound causes a speed of the chopper drum to increase and a rebound signal value that represents a slight rebound causes a speed of the chopper drum to decrease.

13. A device as defined in claim 6, wherein said control and evaluation unit is configured so that the rebound signal influences an intake and compression roller speed, wherein a rebound signal value that represents a strong rebound causes the intake and compression roller speed to decrease, and a rebound signal value that represents a slight rebound causes the intake and compression roller speed to increase.

14. A device as defined in claim 9, wherein the agricultural harvesting machine is a forage harvester, while the agricultural working machine is a tractor.

* * * * *